(12) United States Patent
Charles et al.

(10) Patent No.: US 7,513,535 B2
(45) Date of Patent: Apr. 7, 2009

(54) MICRO-TUBE CONNECTION

(75) Inventors: Raymond Charles, St. Jean de Moirons (FR); Yves Fouillet, Uoreppe (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 10/943,605

(22) Filed: Sep. 17, 2004

(65) Prior Publication Data

US 2005/0035598 A1 Feb. 17, 2005

Related U.S. Application Data

(63) Continuation of application No. 10/627,511, filed on Jul. 25, 2003, now abandoned, which is a continuation of application No. 09/898,733, filed on Jul. 3, 2001, now abandoned.

(30) Foreign Application Priority Data

Jul. 5, 2000 (FR) .................................. 00 08736

(51) Int. Cl.
*F16L 17/00* (2006.01)
(52) U.S. Cl. ....................................... 285/353; 285/349
(58) Field of Classification Search ............. 285/124.1, 285/124.3, 334.5, 405, 350, 353, 234, 281, 285/349, 374, 379, 352
See application file for complete search history.

(56) References Cited

U.S. PATENT DOCUMENTS

| | | | |
|---|---|---|---|
| 1,592,850 A * | 7/1926 | Hansen | 285/352 |
| 1,894,700 A | 1/1933 | Parker | |
| 2,463,196 A | 3/1949 | Parker | |
| 3,751,002 A * | 8/1973 | Folkerts et al. | 285/334.4 |
| 4,690,437 A * | 9/1987 | Anderson, Jr. | 285/356 |
| 4,776,618 A * | 10/1988 | Barree | 285/341 |
| 5,433,454 A * | 7/1995 | Ramberg | 277/643 |
| 5,806,166 A | 9/1998 | Fuser | |
| 6,200,113 B1 * | 3/2001 | Van Davelaar | 417/571 |

FOREIGN PATENT DOCUMENTS

DE 616276 7/1935

\* cited by examiner

*Primary Examiner*—Aaron M Dunwoody
(74) *Attorney, Agent, or Firm*—Nixon Peabody LLP

(57) ABSTRACT

The recess (12) between the main connecting part (8) and a collar (9) contains a toroidal or otherwise shaped sealing ring or joint (3) and the end of a tube (1) incorporating an outer flange (2), whose thickness becomes zero at the crushing bulge (4) of the sealing ring (3). An excellent seal is ensured at this location, even for pressurized fluids, and the assembly can easily be dismantled.

3 Claims, 2 Drawing Sheets

MICRO-TUBE CONNECTION

TITLE OF THE INVENTION

This application is a continuation of prior U.S. patent application Ser. No. 10/627,511 filed Jul. 25, 2003, now abandoned which is a continuation of U.S. patent application Ser. No. 09/898,733 filed Jul. 3, 2001 now abandoned.

BACKGROUND OF THE INVENTION

The present invention relates to the connection of a micro-tube to a structure.

The tubes in question can be flexible, rigid or semi-rigid, have a very small diameter of approximately one millimetre and are able to carry gaseous or liquid fluids at a pressure of several bars.

The sealing at the ends of such micro-tubes is not then easy to ensure in an appropriate manner and requires either crimping, which reduces the opening cross-section of the tube, or complicated and costly fitting, or bonding, which does not permit an easy replacement of the tubes.

The present invention proposes a simple, reliable and dismantlable connection. It is characterized in that it comprises an elastic, cambered joint surrounding the micro-tube, a flange fashioned around the micro-tube tapering out of the micro-tube and extending up to a bulging circumference of the joint, and a collar on the structure, joined to such structure whilst forming a recess in which the joint is held between the faces of the recess on which it bears, the flange bearing on one of said faces.

The flange bearing on one of the faces of the recess ensures a good sealing at this location and this is perfected by the joint which, compressed in the recess in the axial direction of the micro-tube, presses the flange against said face of the recess, whilst offering a supplementary sealing ring around the flange.

Other features, characteristics and advantages of the invention will be described with reference to the attached drawings.

DETAILED DESCRIPTION OF INVENTION

Figure 1:
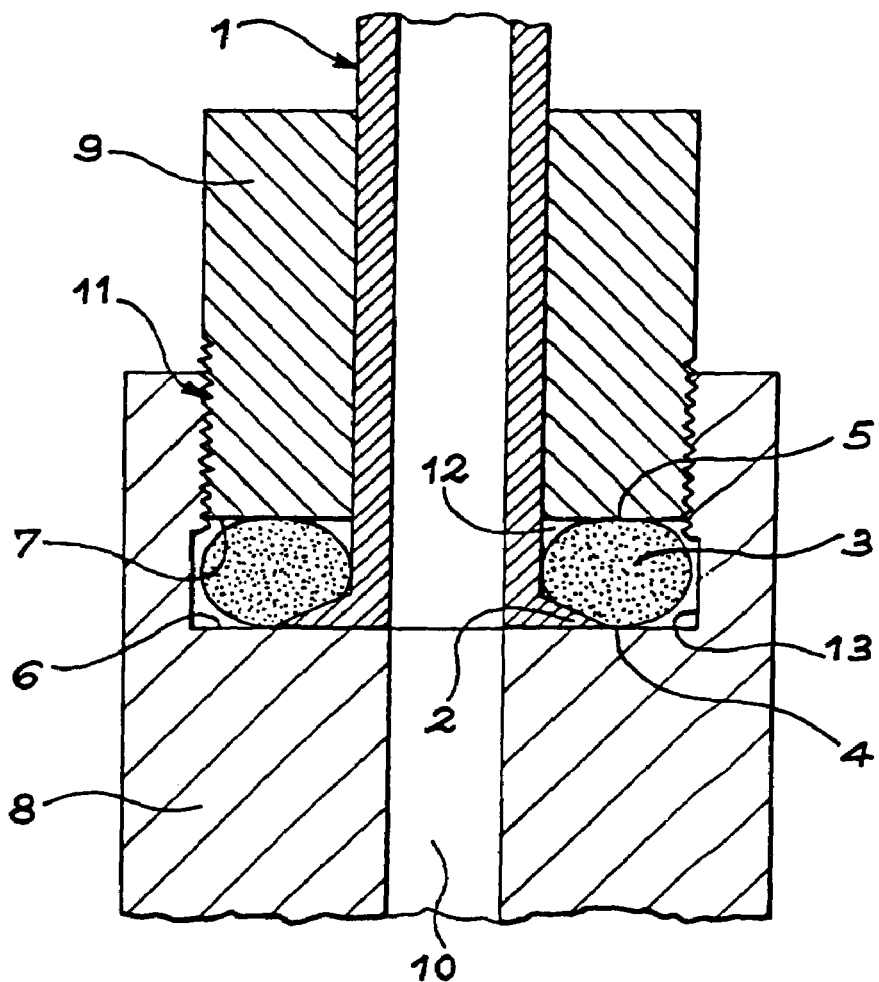
Figure 2:
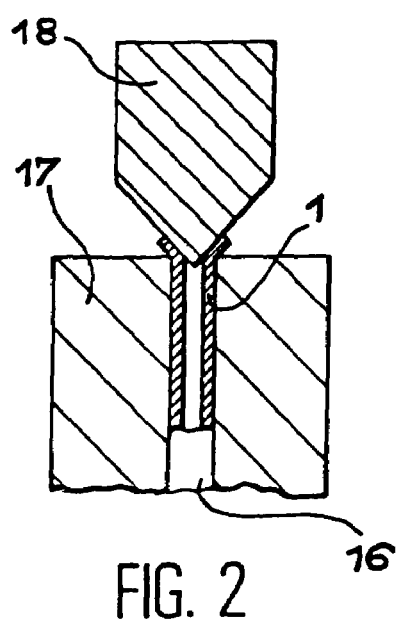
Figure 3:
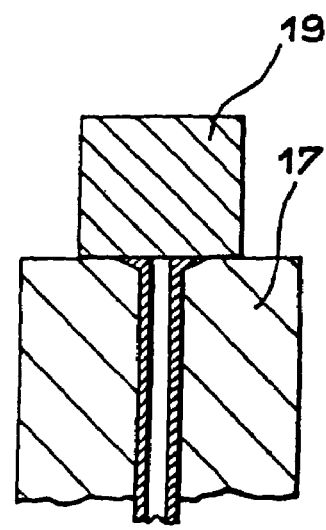
Figure 1A:
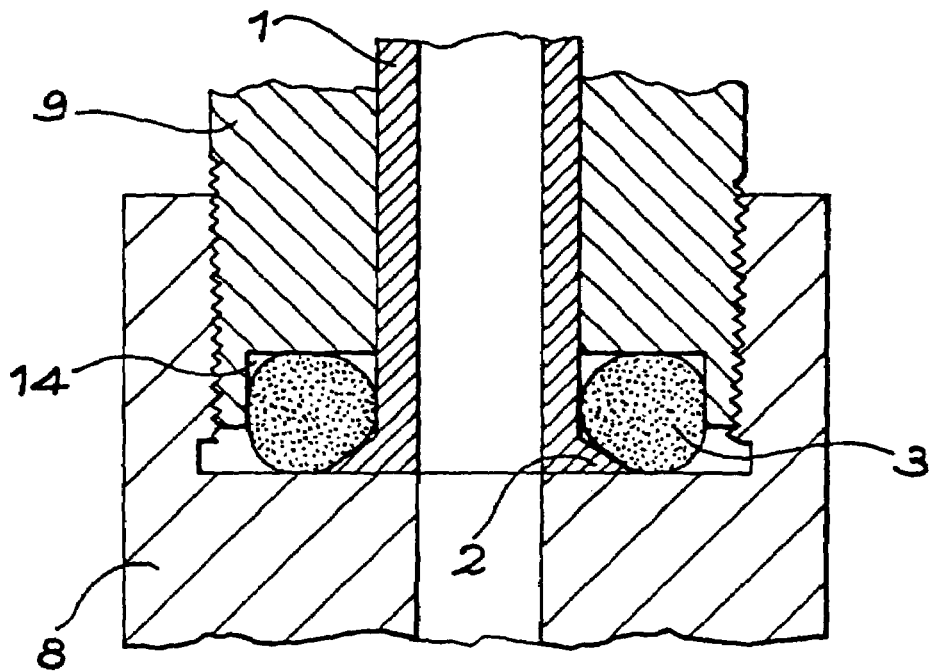
Figure 1B:
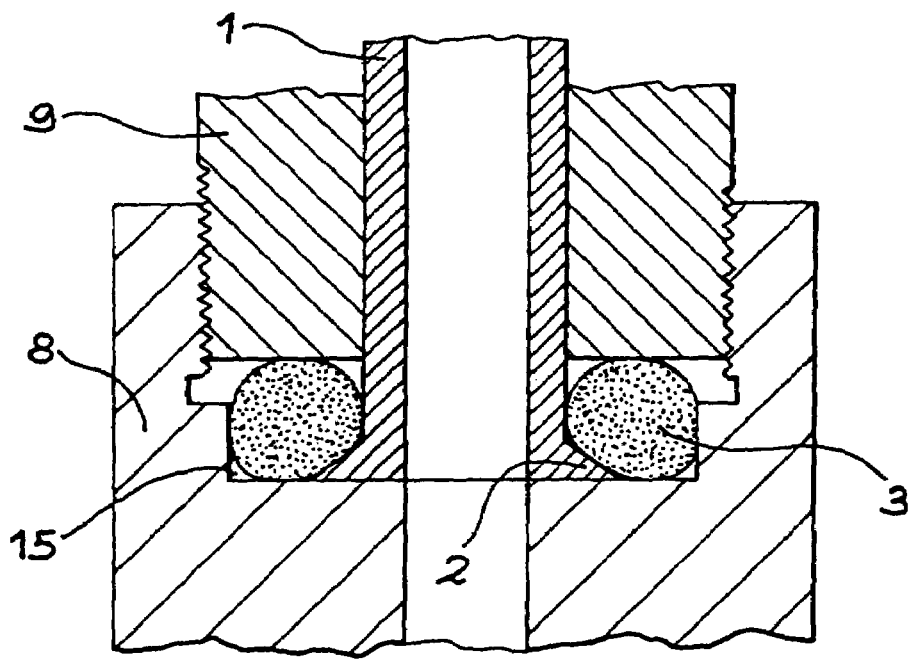

FIG. 1 shows in cross-section an embodiment of the invention, FIGS. 1A and 1B show two variants of FIG. 1 and FIGS. 2 and 3 show an embodiment of the turned-up flange.

A micro-tube 1 is shown in FIG. 1 and terminates in a turned-up flange 2 held in the connection forming the subject matter of the invention. The turned-up flange 2 is in one piece with the micro-tube 1. The connection of the microtube 1 also comprises a sealing ring or joint 3, which can be toroidal in the free state and has opposing bulges 4 and 5 bearing on two faces, respectively 6 and 7, of a main structural part 8 and a collar 9. The main structure part 8 carries a channel 10 extended by the micro-tube 1. The turned-up flange 2 bears on the surface 6 of said main structural part 8, the joint 3 is placed on the turned-up flange 2 and the collar 9 is placed on the joint 3 in order to compress the latter and secure the turned-up flange 2 whilst maintaining it on the face 6. The main structural part 8 can be joined to the collar 9 by a thread 11 on their surfaces making it possible to join them directly by screwing and to move them together as desired by regulating the height of a recess 12 defined by the faces 6 and 7. The collar 9 and structure 8 can be pressed or moved together by any linking means other than direct securing obtained with the aid of the thread 11 referred to in exemplified manner here.

The joint 3 is introduced onto the micro-tube 1 and bears on the turned-up flange 2. Its small diameter is substantially equal to the external diameter of tube 1 and the turned-up flange 2 tapers continuously towards the outside (on moving away from the micro-tube 1) and is cancelled out at a diameter corresponding to that of the bulge 4.

In a preferred embodiment, the mean diameter of the toroidal sealing ring 3 is approximately equal to the external diameter of the turned-up flange 2, so as to ensure a pressure on said flange 2 and the sealing between said flange and the face 6 of the structure 8.

As the joint 3 is pressed by the collar 9, as a consequence it presses the turned-up flange 2 against the opposite surface 6, thus opposing a detachment under the pressure of the fluid flowing through the micro-tube 1 and channel 10 of the main part 8 and tending to separate them. Sealing is mainly produced at the bulge 4 and experience has proved that it remains for fluid pressures reaching 10 bars. In the case of a high fluid pressure, it is advantageous to place the joint 3 in a recess 14, 15 made either on the face 7 of the collar 9, or on the face 6 of the structure 8, so that the areas round the corresponding bulge 4 or 5 of the joint 3 penetrate the same and the radial expansion of the joint 3 is in this way combatted. The recesses 14 and 15 are illustrated in FIGS. 1A and 1B. Unlike the recess 12, they provide support to the periphery of the joint 3. Normally the main structural part 8 is used for multiple connections and has numerous channels 10 connected to the same number of micro-tubes 1 and the recess 12 is wide enough to include the network of connected micro-tubes 1. A circle of screws is then used for joining the collar 9 to the main structural part 8. In other variants, the collar 9 could have an external thread and the main part 8 an internal thread, unlike what is shown here, or other known means for creating these two parts and for moving them together.

A production method for the turned-up flange 2 will be described relative to FIGS. 2 and 3. The micro-tube 1 is inserted in a slot 16 of a die 17 in such a way that its end points somewhat to the outside. A conical punch 18 is introduced into the projecting end and widens it. A flat punch 19 (which can be an opposite face thereof) is then pressed onto the upper face of the die 17 crushing the end of the micro-tube 1 against said surface, which gives the turned-up flange 2 of FIG. 1.

This process is suitable for most micro-tube materials. However, others can be used, more particularly if the micro-tube 1 is flexible. It can then be hardened by heating or some other means, as a function of its composition, once the deformation has taken place. It is also possible to use glass micro-tubes. The aforementioned process will be accompanied by a heating operation in order to soften the glass.

Generally the flanges are produced by a permanent material deformation process.

The sealing ring or joint 3 illustrated is toroidal. Cross-sections other than circular are suitable provided that they have bulges bearing on the opposite faces 6 and 7 of the recess 12 in order to press the flange 2 against the face 6. In the same way a flange 2 is shown stopping at the diameter of the joint 3 corresponding to the greatest height (between bulges 4 and 5), but it is unnecessary to precisely respect this condition and the flange 2 could be slightly wider or narrower. However, the configuration shown is preferred.

The invention claimed is:

1. A device for connecting a micro-tube which is constructed for carrying a fluid at a pressure of several bars to a structure, comprising an elastic, cambered joint surrounding the micro-tube, a flange fashioned around the micro-tube and extending up to and stopping at a bulging circumference of the joint, said flange having a first surface which extends from the inner surface of said micro tube at a right angle with respect to the axis of said micro tube, and a collar on the structure, joined to such structure while forming a recess in which the joint is held between the faces of the recess, wherein said flange and at least a portion of said bulging circumference of said joint both contact a same surface of the structure, wherein said flange has a first surface and a second surface which meet each other at an apex, and said apex contacts the surface of said structure.

2. A device according to claim 1 wherein said flange tapers continuously towards the apex.

3. A device according to claim 1 wherein said second surface extends from the outer surface of the micro tube at an oblique angle relative to the axis of said micro tube.

* * * * *